United States Patent Office 3,253,920
Patented May 31, 1966

3,253,920
REJUVENATION OF PHOTOGRAPHIC DEVELOPERS USING ION EXCHANGE RESINS
Herbert L. Rees, Courtenay D. Anselm, and John M. Hansen, all of Rochester, N.Y., assignors to Eastman Kodak Company, Rochester, N.Y., a corporation of New Jersey
No Drawing. Filed June 7, 1961, Ser. No. 115,307
11 Claims. (Cl. 96—55)

This is a continuation-in-part of U.S. patent application Serial No. 515,510, filed on June 14, 1955, now abandoned.

This invention concerns a method of reclaiming used photographic processing solutions more particularly developer solutions used for both black-and-white and color sensitized material developing.

In photographic processing, it is customary to develop the films, plates, paper and the like in solutions containing developing agents as well as sodium bromide, potassium iodide, sodium sulfate and the like. However, as the developing proceeds, bromide and iodide ions concentrations build up which limit the quantity of the sensitized material which can be processed before adverse photographic effects are noted. In many installations a replenishment system is devised which limits the upper level of bromide and iodide ions present in the processing tank. However, this process necessitates the continual discarding of tank solutions which contain considerable quantities of process chemicals.

In black-and-white developers and color developers certain decomposition products of the developing agents are also released into the processing solution which can have an adverse effect on the sensitized material.

The use of ion exchange resins to selectively exchange many cations and anions from water and other solutions is well known. However, ion exchange resins have not been used to remove bromide and iodide ions from photographic developers. We have discovered that certain ion exchange resins can be used to remove these ions and also to remove unwanted reaction products from the solution and replace them with sulfate or some other ions which can be tolerated in the photographic developer without adverse photographic effects.

One of the objects of our invention is to provide a method of rejuvenating used photographic processing solutions. Another object is to provide a process for removing decomposition products and unwanted anions from photographic developer solutions. A further object is to selectively remove anions from developer solutions used for processing color films in which certain anions are picked up by the exchange resins and then replaced by other non-photographically active anions.

The above objects are attained by contacting the used developer solutions with anion exchange resins. We have discovered that a strongly basic anion exchange resin is preferred for which we have used commercially available organic synthetic resins such as Nalcite A-1 and A-2, Dowex 1, Permutit S-1 and Amberlite IRA-400, 401 and 410 which are strongly basic anionic exchange resins with quaternary ammonium groups attached to a hydrocarbon polymer. However, other basic ion exchange resins may be used such as Ionac A-300 and Amberlite-IR 4B which are amine phenol-formaldehyde resins and Duolite A-3 which is an aliphatic amine phenol-formaldehyde resin. The specific resin used is selected depending upon its stability under the operating conditions used and the number of cycles in which it can be continuously used and reactivated.

The ion exchange resins are treated with sulfuric acid in our preferred embodiment to obtain the resins in the sulfate form. In this way, the acidic properties are obtained which are desirable in carrying out our process. However, any inorganic acid or salt solution with a sufficiently low pH, including bicarbonate solutions, may be used, since the color couplers revert to the free acid, non-ionic form below a certain pH.

Our process is particularly suitable for treatment of color developers which contain certain relatively expensive chemical components. For instance, the couplers are complex molecules which require several costly chemical operations to manufacture. In the event that these developer solutions must be discarded, the expensive components must be completely replaced. The use of the ion exchange resins removes the decomposition products (D.P.'s), as well as all, or almost all, of the iodide, bromide, or the like ions from the solutions and a high percentage of the desirable chemicals are retained.

In some color developer solutions, the couplers exist as soluble anions. Therefore, when the solution is passed through the ion-exchange resin, at a pH above 9.0, the ionized coupler as well as the unwanted ions, such as bromide, iodide, and decomposition products, are adsorbed on the resin. After a period of use, which is determined empirically, the ion exchange resins must be regenerated for reuse. This is normally done by passing through the resin a regenerant solution containing an ion which exchanges for the halides and the D.P.'s on the resin. The effluent from this resin regeneration cycle is discarded.

The use of a relatively acid regenerant (below pH 9.0) results in changing the ionized coupler adsorbed on the resin to a non-ionic form. Since it is non-ionic, it is not removed like bromide and iodide ions during the regeneration cycle. Therefore, when the regenerated ion exchange resin has been used for a period of time, possibly 2 or 3 cycles, in the recovery process, it comes to equilibrium with the coupler and the coupler yields in the treated developer solutions remain at around 80–90%.

Various ways are known of contacting the liquid to be treated with ion exchange resins such as the fixed bed type of equipment or the agitated treating tank method. One method involves the use of a tubular countercurrent contacting device which consists of a cylindrical exchange member containing a full length continuously bladed rotor whose purpose is to suspend the ion exchange resin in the fluid being treated.

The following examples are given to illustrate our invention but are not intended to restrict it in any way:

*Example 1*

A color developer for a negative film was passed through an Amberlite IRA-400 column in the sulfate form. The following results, showing the composition of the composite effluent, illustrate the reduction in bromide ion concentration:

| Constituent | Original Solution | Resin Treated Solution |
|---|---|---|
| Developing Agent, g./l | 4.70 | 4.39 |
| Benzyl Alcohol, ml./l | 3.47 | 3.41 |
| Potassium Bromide, g./l | 1.01 | 0.75 |
| Sodium Sulfate, g./l | 2.00 | 1.70 |
| pH | 10.70 | 10.60 |

Example 2

After 200 volumes of a color developer used in another negative color film process were passed through a Permutit S-1 column in the sulfate form, the following results, showing the composition of the composite effluent, were obtained:

| Constituent | Original Solution | Resin Treated Solution |
|---|---|---|
| Developing Agent, g./l | 5.17 | 4.84 |
| Benzyl Alcohol, ml./l | 9.67 | 9.50 |
| Calgon, g./l | 2.01 | 1.95 |
| Sodium Bromide, g./l | 1.52 | 1.39 |
| Benzotriazole, mg./l | 14.5 | 2.8 |
| Potassium Iodide, mg./l | 0.43 | 0.27 |
| Developing Agent Decomposition Products, g./l | 0.37 | 0.21 |
| Sodium Thiocyanate, g./l | 0.225 | 0.064 |
| pH | 10.93 | 10.83 |

The reduction in concentration of bromide and iodide ions and of developing agent decomposition products is demonstrated.

Example 3

Amberlite IRA-410 exchange resin as received from the manufacturer in the chloride form was contacted with 26 volumes of a used yellow developer which was discarded, washed with water, and then regenerated with 26 volumes of a 5% sodium bicarbonate solution and rinsed again with water. Three consecutive cycles were made to bring the resin to equilibrium and twenty-six volumes of yellow developer were passed through the regenerated Amberlite resin, with the following results:

| Constituent | Original Solution | Resin Treated Solution |
|---|---|---|
| Developing Agent—4-Amino-N,N-diethyl-m-toluidine, g./l | 2.74 | 2.05 |
| Coupler—4-(paratoluenesulfonylamino)—ω—benzoylacetanalide, g./l | 0.97 | 0.77 |
| Sodium Bromide, g./l | 0.28 | 0.06 |
| Sodium Sulfite, g./l | 5.10 | 4.70 |
| Hexylene Glycol, ml./l | 20 | 16.40 |
| Potassium Iodide, mg./l | 15 | 4.9 |
| 6-Nitrobenzimidazole nitrate, mg./l | 18 | 0 |
| pH | 12.37 | 11.3 |

In a similar manner, the basic ion exchange resins may be prepared for use in recovering developer solutions by passing a suitable regenerant having pH of 9.0 or less through the resin.

Example 4

Amberlite IRA-410 resin was used for a number of cycles. This resin which was then regenerated using sulfuric acid, contained deposited coupler, 4-(paratoluenesulfonylamino) — ω — benzoylacetanalide. Twenty-six volumes of yellow developer were passed through the regenerated Amberlite resin, with the following results:

| Constituent | Original Solution | Resin Treated Solution |
|---|---|---|
| Developing Agent—4-amino-N,N-diethyl-m-toluidine, g./l | 2.74 | 2.24 |
| Coupler—4-(paratoluenesulfonylamino)—ω—benzoylacetanalide, g./l | 0.97 | 0.80 |
| Sodium Bromide, g./l | 0.28 | 0.09 |
| Sodium Sulfite, g./l | 5.10 | 4.73 |
| Hexylene Glycol, ml./l | 20 | 16.40 |
| Potassium Iodide, mg./l | 15 | 1 |
| 6-Nitrobenzimidazole nitrate, mg./l | 18 | 0 |
| pH | 12.37 | 11.70 |

The results show that about two-thirds of the bromide and almost all of the iodide were removed while 82% of the coupler and developer agent were retained.

Example 5

| Constituent | Original Solution | Resin Treated Solution |
|---|---|---|
| Sodium Sulfite, g./l | 75.9 | 73.5 |
| Elon, g./l | 4.50 | 1.83 |
| Hydroquinone, g./l | 2.60 | .44 |
| Hydroquinone Sulfonate, g./l | 2.27 | .17 |
| Isopropyl Amine, g./l | 6.50 | 5.88 |
| Sodium Bromide, g./l | 2.57 | .16 |
| Potassium Iodide, mg./l | 15 | 2 |
| pH | 10.36 | 10.20 |
| Sp. G | 1.098 | 1.090 |

These results on a black-and-white developer illustrate the reduction in the undesirable sodium bromide, sodium iodide, and hydroquinone sulfonate.

Example 6

Three ion exchange columns were employed comprising one-inch diameter glass tubes packed with 150 milliliters of Rohm and Haas Amberlite IRA-410 anion resin. Used color developer solutions were obtained from color processing machines used for commercial purposes. The resin in the sulfate form was washed with water in each of the columns and the used developer passed through the columns, the cyan developer in the first column, the yellow developer in the second column, and the magneta developer in the third column, according to the following cycle:

(a) 3 liters developer flowing down the column
(b) ½ liter water flowing down the column
(c) 1 liter water flowing up the column (backwash)
(d) 3 liters 5% $H_2SO_4$ flowing down the column (regeneration)
(e) ½ liter water flowing down the column Flow rate of each step in the cycle was 15-20 milliliters per minute.

On the seventh cycle, the entire three liters of each developer was collected and analyzed. Results are tabulated below:

| Test | Cyan | | | Yellow | | | Magenta | | |
|---|---|---|---|---|---|---|---|---|---|
| | Tank Level | Recovered Sample | Repl. Level | Tank Level | Recovered Sample | Repl. Level | Tank Level | Recovered Sample | Repl. Level |
| pH | 12.40 | 11.70 | 12.50 | 12.00 | 10.90 | 12.20 | 10.80 | 10.29 | 11.00 |
| Sp. Gr | 1.070 | 1.063 | 1.070 | 1.070 | 1.067 | 1.070 | 1.068 | 1.065 | 1.076 |
| Developer [1] | 1.50 | 1.12 | 1.74 | 2.80 | 2.43 | 4.20 | 3.2 | 2.65 | 4.30 |
| Coupler [2] | 1.23 | .91 | 1.54 | 1.30 | 1.05 | 2.10 | 1.70 | 1.43 | 2.75 |
| NaBr | 2.45 | 1.43 | 1.70 | .9 | .31 | 0 | .2–.3 | 0 | 0 |
| KI | 8.0 | 0 | 0 | 22.27 | 3.5 | 0 | 7.0 | .8 | 0 |
| SO$_3$= | 11.0 | 8.3 | 10.0 | 10.0 | 10.0 | 11.5 | 5.6 | 4.96 | 6.0 |
| 6-nitrobenzotriazole | 4.0 | .7 | 6.0 | 9.0 | 1.30 | 11.0 | | | |
| p-Monobenzylaminophenol | .40 | .12 | .74 | | | | | | |
| NaCNS | 1.0 | .14 | 1.10 | | | | 1.0 | .16 | 1.20 |
| 1-phenyl-3-pyrazolidone | | | | .3 | .2 | .40 | | | |
| Citrazinic acid | | | | | | | 1.18 | 1.05 | 1.20 |

NOTE: All figures are in g./l., except KI which are in mg./l. and AF-71 in ml./l.
[1] Cyan developer: 4-amino-N-ethyl-N[β-hydroxyethyl] m-toluidene sulfate.
[1] Magenta developer: 4-amino-N-ethyl-N[β-methane sulfonamidoethyl] m-toluidene sesquisulfate monohydrate.
[1] Yellow developer: N,N-diethyl p-phenylenediamine monohydrochloride.
[2] Cyan coupler: o-acetamidophenol.
[2] Yellow coupler: o-methoxy-α-benzoxylacetanilide.
[2] Magenta coupler: 1-(p-nitrophenoxyacetamido)-3-(2,4,6-trichlorophenyl)-5-pyrazolone.

The above data indicate that ion exchange recovery can be used for these three color developers; cyan, yellow, and magenta. The values given for the replenishers (repl. level) show the desired concentration of the various components to permit reuse of the solution.

Various "amine exchange resins" may be substituted for those illustrated herein. Amberlite IRA–400 and 401, Dowex 1, and Permutit S–1 ion exchange resins are polystyrene-divinylbenzene polymers which contain quaternary ammonium groups for the active exchange groupings.

Amberlite IRA–410 is a solid insoluble ion exchange resin having quaternary ammonium groups on a polystyrene nucleus, "Ion Exchange Resins" by Robert Kunin, 158, 2nd edition, Wiley, New York.

The term "volume" as used herein refers to the volume of the ion exchange resin employed. Therefore, if one liter of resin is used, one volume of wash water, developer solution, or the like would be one liter.

The coupler referred to is the component which combines with the oxidized developer in the solution to form the dye image. In these high pH developer solutions, the organic components are present in the ionized form.

It will be appreciated that for most purposes, the reclaimed developer solutions require the addition of components which were used or depleted during normal processing. After replacing these components, the reconstituted developer solution can be used as a substitute for or in admixture with fresh developer solutions.

A particularly unexpected action takes place in the use of ion exchange resins to regenerate developer in that most of the ions which are removed are those which build up as a result of developer use. For instance, in a typical color developer, the following anions may be present in the solution: hexametaphopsate, sulfite, bromide, iodide, borate, sulfate, hydroxide, thiocyanate, and benzotriazole. The ion exchange resin, for the most part, removes bromide and iodide which need to be removed for developer reuse as well as benzotriazole and thiocyanate (which constitute a minor part of the cost of the developer formula). This specificity of the removal of the unwanted ions indicates the practical adaptability of this invention.

The invention has been described in detail with particular reference to preferred embodiments thereof, but it will be understood that variations and modifications can be effected within the spirit and scope of the invention as described hereinabove and as define in the appended claims.

The ion exchange resins as described in the claims refer to the regenerated form of the ion exchange resin which has been treated with a regenerant solution having a pH of 9.0 or less.

We claim:
1. A method for preserving color coupler ions along with removal of detrimental ions from a photographic color developer solution which has been used for processing photographic color materials but whose development rate has been lowered through the accumulation of halogen ions, said color developer solution containing organic color coupler ions of a coupler which is ionized at a pH above about 9.0 and containing at least one ion selected from the class consisting of hexametaphosphate, sulfite, borate, bromide, chloride, iodide, sulfate, hydroxide, thiocyanate and benzotriazole ions, comprising contacting the developer solution at a pH above about 9.0 with at least one solid insoluble, strongly basic ion exchange resin to remove ions and regenerating the ion exchange resin at a pH below about 9.0, retaining the color coupler on the ion exchange resin.

2. A method according to claim 1 in which the ion exchange resin is regenerated at a pH below about 9.0 while retaining the color coupler on the ion exchange resin and then reusing said ion exchange resin to contact additional photographic color developer solution which has been used to process photographic color materials, but whose development rate has been lowered through the accumulation of halogen ions.

3. A method according to claim 1 in which the ion exchange resin is then regenerated at a pH above about 9.0 to remove the color coupler from the ion exchange resin.

4. A method for preserving color coupler ions along with removal of detrimental ions from a photographic color developer solution which has been used for processing photographic color materials but whose development rate has been lowered through the accumulation of halogen ions, said color developer solution containing organic color coupler ions of a coupler which is ionized at a pH above about 9.0 and containing at least one ion selected from the class consisting of hexametaphosphate, sulfite, borate, bromide, chloride, iodide, sulfate, hydroxide, thiocyanate and benzotriazole ions, comprising contacting the developer solution at a pH above about 9.0 with at least one solid insoluble, strongly basic ion exchange resin to remove ions and regenerating the ion exchange resin at a pH below about 9.0, retaining the color coupler on the ion exchange resin, regenerating the ion exchange resin at a pH above about 9.0 to remove the color coupler from the ion exchange resin and adding the said removed color coupler to said developer solution which had been contacted with the ion exchange resin at a pH below about 9.0.

5. A method for preserving color coupler ions along with removal of detrimental ions from a photographic color developer solution which has been used for processing photographic color materials but whose development rate has been lowered through the accumulation of halogen ions, said color developer solution containing organic color coupler ions of a coupler which is ionized at a pH above about 9.0 and containing at least one ion selected from the class consisting of hexametaphosphate, sulfite, borate, bromide, chloride, iodide, sulfate, hydroxide, thiocyanate and benzotriazole ions, comprising contacting the developer solution at a pH above about 9.0 with at least one solid insoluble, strongly basic ion exchange resin to remove ions and regenerating the ion exchange resin at a pH below about 9.0, retaining the color coupler on the ion exchange resin, regenerating the ion exchange resin at a pH above about 9.0 to remove the color coupler from the ion exchange resin, adding the said removed color coupler to said developer solution which had been contacted with the ion exchange resin at a pH below about 9.0 and then adding to the said developer solution sufficient ions to restore the developer.

6. A method for preserving color coupler ions along with removal of detrimental ions from a photographic color developer solution which has been used for processing photographic color materials but whose development rate has been lowered through the accumulation of halogen ions, said color developing solution containing organic color coupler ions of a coupler which is ionized at a pH above about 9.0 and containing at least one ion selected from the class consisting of hexametaphosphate, sulfite, borate, bromide, chloride, iodide, sulfate, hydroxide, thiocyanate and benzotriazole ions, comprising contacting the developer solution at a pH above about 9.0 with a solid insoluble ion exchange amine phenol-formaldehyde resin to remove ions from the used color developer solution and regenerating the ion exchange resin at a pH below about 9.0, retaining the color coupler on the ion exchange resin.

7. A method according to claim 6 comprising regenerating the ion exchange resin at a pH below about 9.0, while retaining the color coupler on the ion exchange resin and then reusing said ion exchange resin to contact additional photographic color developer solution which has been used to process photographic color materials, but whose development rate has been lowered through the accumulation of halogen ions.

8. A method according to claim 6 in which the ion exchange resin is then regenerated at a pH above about 9.0 to remove the color coupler from the ion exchange resin.

9. A method for preserving color coupler ions along with removal of detrimental ions from a photographic color developer solution which has been used for processing photographic color materials but whose development rate has been lowered through the accumulation of halogen ions, said color developing solution containing organic color coupler ions of a coupler which is ionized at a pH above about 9.0 and containing at least one ion selected from the class consisting of hexametaphosphate, sulfite, borate, bromide, chloride, iodide, sulfate, hydroxide, thiocyanate and benzotriazole ions, comprising contacting the developer solution at a pH above about 9.0 with a solid insoluble ion exchange polystyrene-divinyl benzene resin containing quaternary ammonium groups and regenerating the ion exchange resin at a pH below about 9.0, retaining the color coupler on the ion exchange resin.

10. A method according to claim 9 in which the ion exchange resin is regenerated at a pH below about 9.0, while retaining the color coupler on the ion exchange resin and then reusing said ion exchange resin to contact additional photographic color developer solution which has been used to process photographic color materials, but whose development rate has been lowered through the accumulation of halogen ions.

11. A method according to claim 9 in which the ion exchange resin is then regenerated at a pH above about 9.0 to remove the color coupler from the ion exchange resin.

References Cited by the Examiner

FOREIGN PATENTS 626,081    7/1949    Great Britain.

OTHER REFERENCES

Journal of the Society of Motion Picture Engineers, vol. 53, pp. 183–192, August 1949.

Journal of the Society of Motion Picture and Television Engineers, vol. 65, pp. 478–484, September 1956.

Photographic Engineering, vol. 1, No. 3, pp. 69–75, 1950.

Photographic Engineering, vol. 2, No. 3, pp. 102–115, 1951.

Venkataraman, Synthetic Dyes, vol. 11, 1952, pp. 1331–1332.

NORMAN G. TORCHIN, *Primary Examiner.*

PHILIP E. MANGAN, *Examiner.*

G. H. BJORGE, A. D. RICCI, *Assistant Examiners.*